W. H. WILDER.
Plow-Wheel Standard.
No. 212,076.  Patented Feb. 4, 1879.
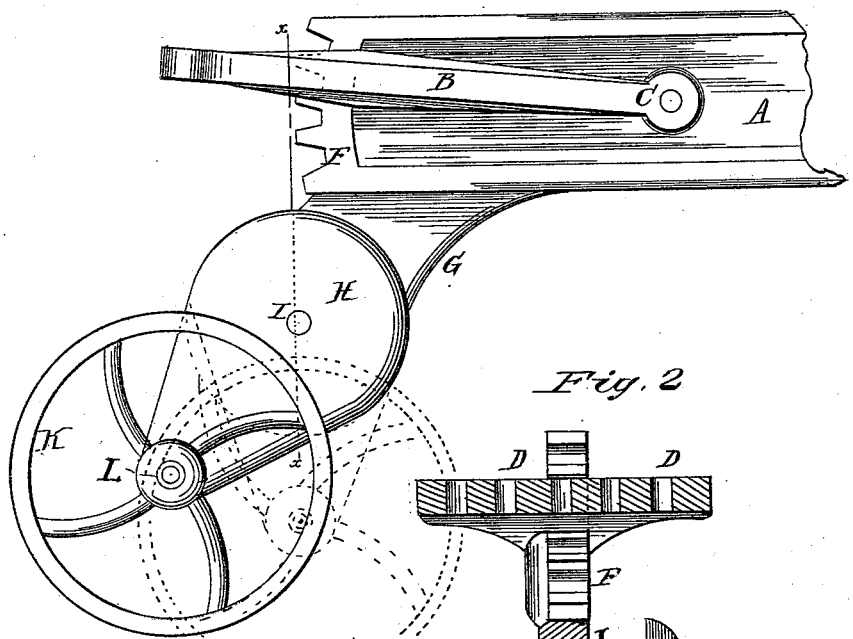
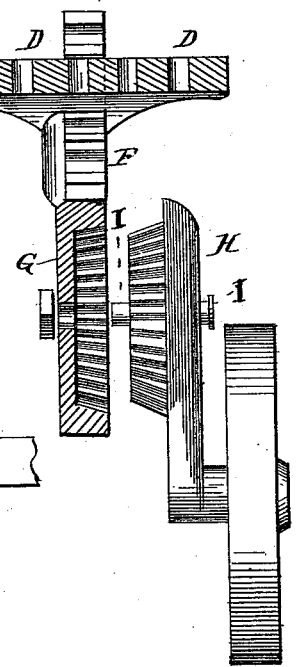
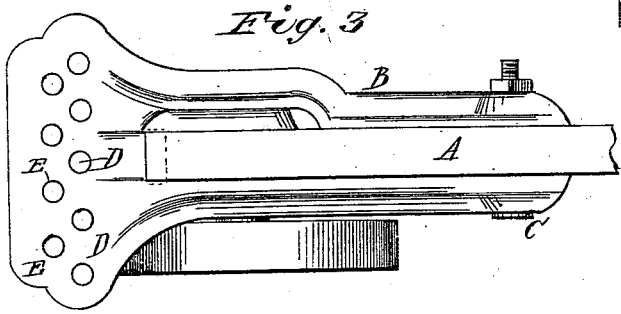

UNITED STATES PATENT OFFICE.

WILLIAM H. WILDER, OF WATERPORT, NEW YORK.

IMPROVEMENT IN PLOW-WHEEL STANDARDS.

Specification forming part of Letters Patent No. 212,076, dated February 4, 1879; application filed March 25, 1878.

*To all whom it may concern:*

Be it known that I, WILLIAM H. WILDER, of Waterport, in the county of Orleans and State of New York, have invented certain new and useful Improvements in Plow-Wheel Standards or Shanks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In the accompanying drawings, Figure 1 is a side view of the forward end of a plow-beam with my clevis and improved wheel-standard attached thereto. Fig. 2 is a vertical section on the line $x\ x$ of Fig. 1, also showing the wheel in top view. Fig. 3 is a top view of the clevis in place with the wheel below.

My invention or improvement relates to guiding the plow; and consists of a novel construction of plow-wheel standard or shank, all of which will be fully understood by the following description.

Upon the forward end of the beam A the clevis B is bolted or pivoted by means of the bolt C, so as to be adjustable up and down in the notches F, thus regulating the draft and the consequent depth to which the plow runs into the ground. This clevis has two rows of holes, as seen at D and E, Fig. 3, for the purpose of allowing either a slight adjustment or a great adjustment of the draft from right to left and left to right. One set of these holes is placed opposite the spaces between the other set of holes, as shown in Fig. 3. By this arrangement of holes the clevis is not weakened so as to be liable to break, and yet a very nice adjustment can be made from right to left through a range of eight inches.

In the plow-wheel standard, and for the purpose of adjusting the same, I employ two disks or plates, G and H, with notches fitting each other, and connect these disks by means of a nut-bolt, I. The disk or plate G is cast with an internal beveled notched bearing, and the disk or plate H is cast with an external beveled notched bearing. Now, this plate H is too large—that is, the external projecting beveled notched bearing is too large to sink home into the space or cavity of the plate G, or its internal beveled circular notched bearing. By this construction the nut on bolt I, when strained under the nut-wrench, binds the two plates immovably together. If the plates are worn and become loose, a light strain upon the nut firmly closes the two beveled notched surfaces of the disks or plates upon each other, and again holds the same immovably until long wear and jar may again call for a slight turn of the nut on bolt I.

The wheel K is provided with the usual journal L, and thus attached to the shank H. The disk G may be cast in the same piece with plow-beam A, or cast separately and then bolted to the beam.

I claim—

The plate G, having a beveled internal notched bearing, in combination with plate H, provided with an external beveled notched bearing, and the nut-bolt I, substantially as and for the purposes set forth.

In testimony that I claim the foregoing as my own I affix my signature in presence of two witnesses.

WM. H. WILDER.

Witnesses:
 F. L. JUNE,
 FRED. G. MILLER.